United States Patent [19]
Asayama

[11] Patent Number: 5,633,705
[45] Date of Patent: May 27, 1997

[54] OBSTACLE DETECTING SYSTEM FOR A MOTOR VEHICLE

[75] Inventor: Yoshiaki Asayama, Himeji, Japan

[73] Assignee: Mitsubishi Denki Kabushiki Kaisha, Tokyo, Japan

[21] Appl. No.: 434,854

[22] Filed: May 4, 1995

[30] Foreign Application Priority Data

May 26, 1994 [JP] Japan ................................. 6-112798

[51] Int. Cl.⁶ .............................. H04N 7/18; G01C 3/00; G01C 3/08; B60T 7/16
[52] U.S. Cl. ........................ 356/3.14; 348/139; 356/5.01; 180/167; 180/169
[58] Field of Search ........................... 348/140, 139; 180/169, 167; 356/4.01–5.15, 3.14

[56] References Cited

U.S. PATENT DOCUMENTS

| | | | |
|---|---|---|---|
| 4,333,106 | 6/1982 | Lowe | 358/107 |
| 4,477,184 | 10/1984 | Endo | 180/169 |
| 4,632,543 | 12/1986 | Endo | 356/5 |
| 5,187,537 | 2/1993 | Asayama | 356/1 |
| 5,214,408 | 5/1993 | Asayama | 340/435 |

FOREIGN PATENT DOCUMENTS

| | | |
|---|---|---|
| 0512872 | 11/1992 | European Pat. Off. . |
| 41 10 132 | 10/1991 | Germany . |
| 43 44 485 | 6/1994 | Germany . |
| 155211 | 5/1992 | Japan . |
| 193641 | 7/1992 | Japan . |
| 2265779 | 10/1993 | United Kingdom . |
| WO9501577 | 1/1995 | WIPO . |

*Primary Examiner*—Stephen C. Buczinski
*Attorney, Agent, or Firm*—Sughrue, Mion, Zinn, Macpeak & Seas

[57] ABSTRACT

An obstacle detecting system for a motor vehicle which is capable of detecting not only the distance to an obstacle(s) existing in front of the motor vehicle and the width thereof, but also its height to thereby allow a motor vehicle control to be effected more appropriately with high reliability. The distance to the object and its width are detected by a laser radar type distance detecting unit, while the distance to the object lying within a window preset by a window setting device is also detected by a distance detecting circuit of a stereoscopic video camera unit. An object size determining unit is provided for selecting a window corresponding to a distance value detected by the stereoscopic video camera unit and which coincides with a distance value calculated by the laser radar type distance detecting unit, to thereby determine the size of the object on the basis of the preset position of the selected window.

7 Claims, 3 Drawing Sheets

100 : MOTOR VEHICLE

40 : IMAGING PLANE

101 : OBSTACLE

41~46 : WINDOWS

OBSTACLE DETECTING SYSTEM FOR A MOTOR VEHICLE

BACKGROUND OF THE INVENTION

1. Field of the Invention

The present invention relates to an obstacle detecting system for a motor vehicle for detecting an object or obstacle such as typified by a car running ahead or in front of the motor vehicle.

2. Description of Related Art

As a obstacle detecting system for a motor vehicle of the type mentioned above and known heretofore, there have been proposed and developed those systems which are based on a laser radar type distance detecting (or ranging) technique and a stereoscopic (or binocular) video camera technique. By way of example, an obstacle detecting system which adopts the laser radar type distance detecting or ranging method is disclosed in Japanese Patent Publications Nos. 6473/1991 and 30117/1991. In these known obstacle detecting systems, a flat laser beam diverging vertically in a sector-like shape is deflected from the left to the right and vice versa in a direction laterally transversely to the direction in which the motor vehicle equipped with the obstacle detecting system is running, for thereby detecting the distance to an object such a car running ahead as well as the width thereof on the basis of the difference between a time point at which the laser beam is emitted and a time point at which an echo beam is received.

On the other hand, an obstacle detecting system for a motor vehicle implemented by using a stereoscopic video camera unit is disclosed, for example, in Japanese Unexamined Patent Application Publication No. 161810/1992 (JP-A-4-161810). In the case of this known obstacle detecting system, a pair of optical systems such as video cameras or the like are disposed at the front side of a motor vehicle in a vertical or horizontal array with a predetermined distance between them, wherein the images of an object such as a car running ahead or an obstacle existing in front which are picked up by the optical systems are focused onto a pair of image sensors. By comparing the video signals outputted from the image sensors after photoelectric conversion and representing the images focused onto the image sensors, deviation between the images on the image sensors is detected, whereon distance to the object is arithmetically determined in accordance with the principle underlying the trigonometric measurement which per se is known.

The hitherto known obstacle detecting systems for a motor vehicle mentioned above however suffer from problems, which will be elucidated below.

With the obstacle detecting system implemented by using the laser radar type distance detecting apparatus, it is only the distance to a car running ahead or an obstacle existing in front and the width thereof that can be detected, because of such arrangement that the flat laser beam of the shape mentioned previously is deflected to the left and right or laterally transversely relative to the direction in which the motor vehicle equipped with the obstacle detecting system is running.

On the other hand, in the case of the obstacle detecting system implemented by using the stereoscopic video camera apparatus, it is only the presence of an object such as an obstacle and the distance thereto that can be detected because the useful information is derived by processing the images of the object picked up through a pair of optical systems in accordance with the trigonometrical measurement principle.

As can be seen from the above, with the obstacle detecting system for a motor vehicle known heretofore, the detection information available is only of the distance to a car running ahead or an obstacle existing in front and the width thereof. It is impossible to obtain information concerning the height of the object. In other words, the amount of information available from the known obstacle detecting system is not sufficient for optimizing the running control of the motor vehicle with high reliability.

Besides, when a fault takes place in the obstacle detecting system constituted solely either by the laser radar type distance detecting apparatus or the stereoscopic video camera apparatus, there arises such situation that the information concerning the object or obstacle existing in front can not be obtained at all, giving rise to another problem.

SUMMARY OF THE INVENTION

In the light of the state of the art described above, it is an object of the present invention to provide an obstacle detecting system for a motor vehicle, which system is capable of detecting not only the distance to an object existing in front and the width but also a height thereof to thereby allow a motor vehicle control to be effected more appropriately or optimally with high reliability.

It is another object of the present invention to provide an obstacle detecting system for a motor vehicle which can enjoy a fault-proof feature.

In view of the above and other objects which will become apparent as the description proceeds, there is provided according to an aspect of the present invention an obstacle detecting system which is composed of a laser radar type distance detecting unit adapted to detect a distance to an object existing in front of the motor vehicle as viewed in a first direction in which the motor vehicle is running, a stereoscopic video camera unit and an object size determining unit. The distance detecting unit is composed of a laser beam sender circuit for sending out a laser beam while deflecting the laser beam in a second direction which laterally transverses the first direction, a light beam receiving circuit for receiving an echo light beam resulting from reflection of the laser beam at the object, and a distance calculating circuit for arithmetically determining a distance to the object on the basis of a temporal period intervening between the send-out of the laser beam and the reception of the echo laser beam. On the other hand, the stereoscopic video camera unit is composed of stereoscopic video cameras (upper and lower video cameras) for picking up an image of an object or objects located within a range swept by the laser beam, a window setting unit for presetting a plurality of windows at predetermined locations on an imaging plane of the stereoscopic video camera unit, and a distance detecting circuit for detecting a distance to an object caught by the stereoscopic video camera unit within at least one of the windows. Further, the aforementioned object size determining unit is designed to select a window corresponding to the distance which is detected by the stereoscopic video camera unit and which coincides with the distance determined by the laser radar type distance detecting unit, to thereby determine arithmetically a size of the object on the basis of the preset position of the selected window.

By virtue of the arrangement of the obstacle detecting system described above, not only information concerning the distance to the object but also the information concerning the size inclusive of the width of the object can be obtained. Thus, by utilizing an increased amount of information abundant in contents, it is possible to perform most optimally and appropriately the running control of the motor vehicle equipped with the obstacle detecting system, inclusive of an alarm trigger control for the motor vehicle. Besides, even when a fault takes place in either the laser radar type distance detecting unit or the stereoscopic video camera unit, there can yet be obtained the information concerning at least the distance to the object or obstacle. Thus, the detection reliability comparable to that of the hitherto known obstacle detecting apparatus can be ensured even when a fault or failure occurs in the obstacle detecting system according to the invention.

In a preferred mode for carrying out the invention, a plurality of windows may be preset in the form of a vertical array on the imaging plane of the stereoscopic video camera unit.

By virtue of the arrangement described above, the information concerning the height of an obstacle which represents one parameter of the size thereof can be obtained without need for complicated processing.

In another preferred mode for carrying out the invention, a plurality of vertical window rows each including a plurality of individual windows may be preset in a horizontal direction on the imaging plane of the stereoscopic video camera unit. In that case, the number of the vertical window rows may be determined in dependence on an angular range which is swept by the laser beam.

By arraying a number of vertical window rows in the horizontal direction on the imaging plane in correspondence to the angular range which is swept or scanned with the laser beam, it is possible to detect simultaneously the heights of a corresponding number of objects or obstacles existing or moving in front substantially in juxtaposition to one another as viewed in the direction in which the motor vehicle equipped with the obstacle detecting system is running.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
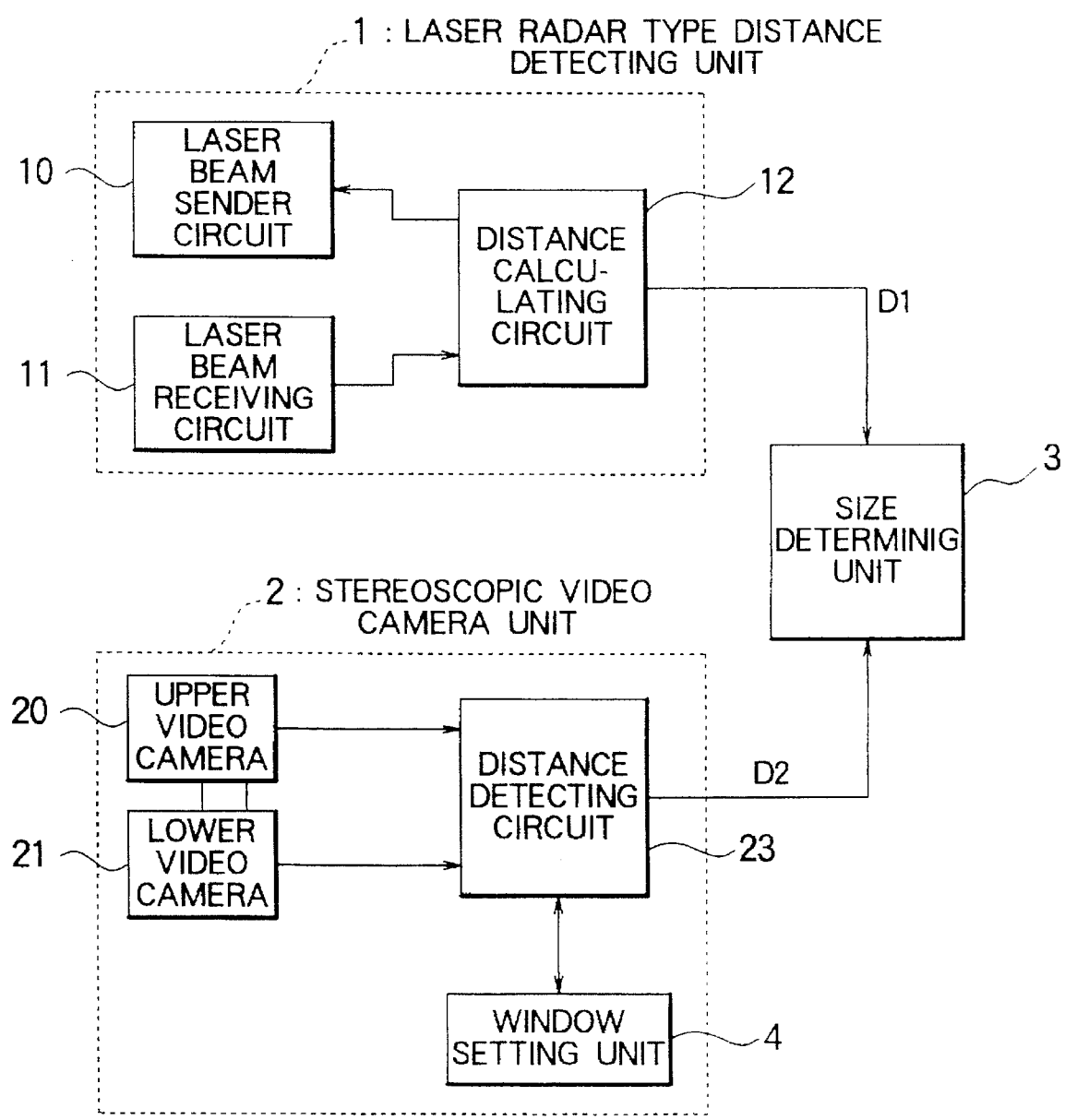
FIG. 1 is a block diagram showing a general arrangement of an obstacle detecting system for a motor vehicle according to a first embodiment of the present invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right" and the like are words of convenience and are not to be construed as limiting terms. Furthermore, with the term "obstacle" used herein, it is intended to represent a moving or stationary object which is found in front of the motor vehicle equipped with the detecting system according to the invention and to which attention has to be paid by a driver of the motor vehicle in order to ensure safety in driving the vehicle. Accordingly, the term "obstacle" should be interpreted in its broadest sense. Thus, the term "object" is also used herein for meaning implicitly the obstacle.

Figure 2:
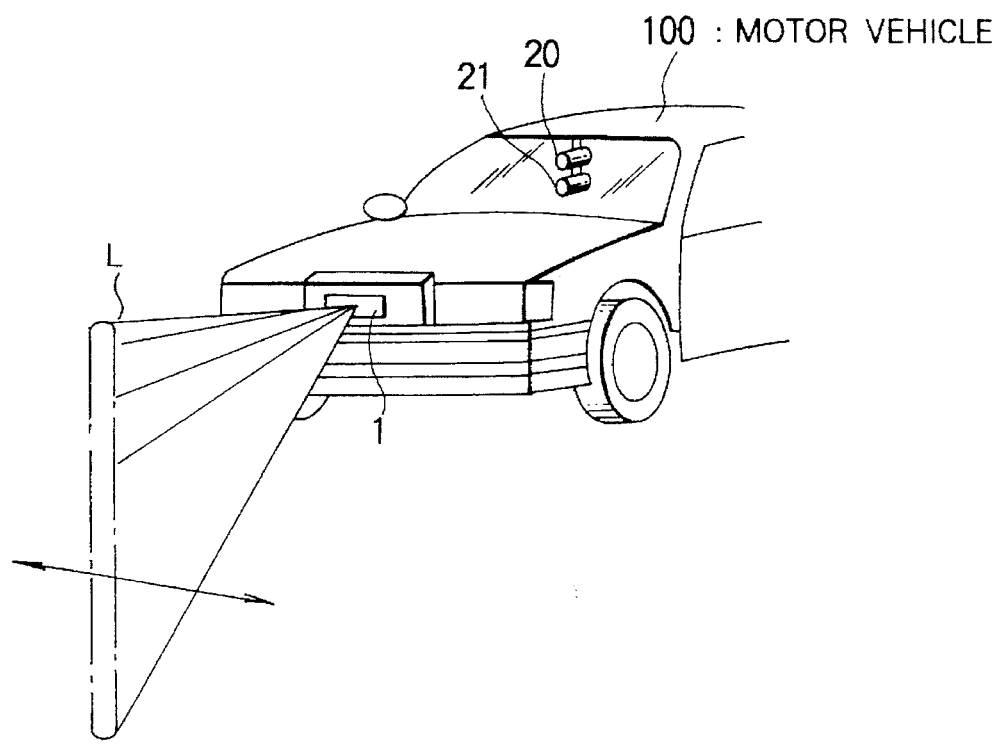
FIG. 2 is a pictorial view showing an outer appearance of a motor vehicle quipped with the obstacle detecting system.

Now, reference is made to FIGS. 1 and 2, in which FIG. 1 is a block diagram showing a general arrangement of an obstacle detecting system for a motor vehicle according to a first embodiment of the present invention, and FIG. 2 is a pictorial view showing an outer appearance of a motor vehicle quipped with the obstacle detecting system. As can be seen in FIG. 1, the obstacle detecting system for a motor vehicle according to the instant embodiment of the invention is generally comprised of a laser radar type distance detecting unit 1, a stereoscopic (or binocular) video camera unit 2 and a size determining unit 3 constituting the size determining means.

In the obstacle detecting system, the laser radar type distance detecting unit 1 is composed of a laser beam sender circuit 10 constituting a laser beam sending means, a laser beam receiving circuit 11 serving as an echo light beam receiving means, and a distance calculating circuit 12. The distance detecting unit is mounted on a motor vehicle 100 at a front (or rear) side portion thereof, as can be seen in FIG. 2. The laser beam sender circuit 10 sends out frontwardly (or rearwardly) a flat laser beam L diverging vertically in a sector-like shape and sweeps or scans a space in front of (or behind) the motor vehicle with the flat laser beam L in the horizontal direction, i.e., from the right to the left and vice versa (see FIG. 2). On the other hand, the laser beam receiving circuit 11 receives an echo light beam which results from reflection of the flat laser beam L by an object such as an obstacle typified by a car or the like if it is present in front of (or behind) the motor vehicle on the way of running thereof. The echo light beam as received is converted into an electric signal by the laser beam receiving circuit 11, which signal is then supplied to the distance calculating circuit 12.

On the other hand, the distance calculating circuit 12 arithmetically determines a temporal difference (i.e., difference in time) between a time point at which the flat laser beam L is emitted from the laser beam sender circuit 10 and a time point at which the echo light beam is caught by the laser beam receiving circuit 11. The distance calculating circuit then determines or calculates a distance to the obstacle on the basis of the aforementioned temporal difference with a sweeping angle (angle of deflection) of the flat laser beam L being taken into account. Further, if the time difference currently determined differs significantly or excessively from the corresponding time difference determined immediately before, it is then decided that the flat laser beam L deviates laterally from a range covered by the obstacle and then calculates a width of the obstacle on the basis of the distance and the angle of deflection of the laser beam. A signal D1 indicative of the distance to the obstacle and the width thereof is generated by the distance calculating circuit 12 to be supplied to the size determining unit 3.

The stereoscopic video camera unit 2 is comprised of an upper video camera 20, a lower video camera 21, a window setting unit 4, and a distance detecting circuit 23 which constitutes the distance detecting means.

The upper video camera 20 and the lower video camera 21 are mounted in a vertical array at a front (or rear) side of a driver's compartment of the motor vehicle 100, as shown in FIG. 2, for picking up an image of an obstacle found within a space swept by the flat laser beam L, wherein the video signals outputted from the upper video camera 20 and the lower video camera 21 are inputted to the distance detecting circuit 23.

The distance detecting circuit 23 is designed to compare the video signals delivered from the upper video camera 20 and the lower video camera 21, respectively, to thereby detect a deviation between the images represented by both the video signals and determines the distance to the obstacle in accordance with the principle underlying the trigonometrical measurement which per se is known in the art. Further, a plurality of rectangular widows are set by the window setting unit 4 on an imaging plane on which the images picked up by the video cameras 20 and 21 are focussed or generated.

Figure 3:
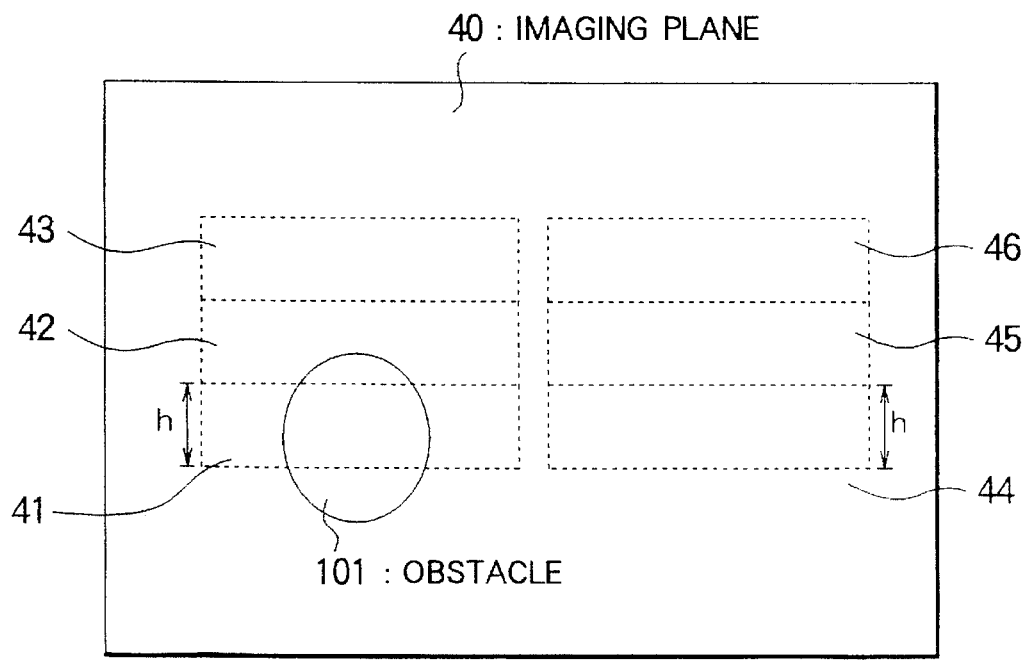
FIG. 3 is a schematic diagram for illustrating a state in which a plurality of windows are preset on an imaging plane of a stereoscopic video camera unit constituting a part of the obstacle detecting system.

More specifically, the window setting unit 4 is designed to generate the widow in correspondence to the sweeping angle (i.e., angle of deflection) of the flat laser beam L. In the case of the instant embodiment, three windows 41 to 43 are generated in a vertical array in a left half of the imaging plane or screen while three widows 44 to 46 are generated in a vertical row in a right half, as shown in FIG. 3.

Further, the window setting unit 4 has a function for changing the height h on the basis of the distance information supplied from the distance detecting circuit 23. More specifically, the window setting unit 4 sets the windows each having a preset height h0 which is determined previously for a present distance. However, when the actual distance to the obstacle becomes longer than the preset height h0, the height h of the window (see FIG. 3) is decreased in correspondence to the actual distance, whereas when the actual distance to the obstacle becomes shorter than the preset distance h0, the height h of the window is increased in correspondence to the distance detected actually.

Furthermore, the distance detecting circuit 23 is so designed to generate a signal D2 indicating the distance to the obstacle and containing the information indicating in which of the windows the image of the obstacle is focussed. The signal D2 outputted from the distance detecting circuit 23 is supplied to the size determining unit 3.

The size determining unit 3 compares the signal D1 supplied from the distance calculating circuit 12 of the laser radar type distance detecting unit 1 with the signal D2 supplied from the distance detecting circuit 23 incorporated in the stereoscopic video camera unit 2 to thereby select on the basis of the signal D2 the window covering the obstacle located at the distance which coincides with that indicated by the signal D1, to thereby determine the size of the obstacle on the basis of the preset position of the window within which the obstacle appears.

More specifically, referring to FIG. 3, an object or obstacle 101 which is located at a distance indicated by the signal D1 supplied from the distance calculating circuit 12 and whose image is generated on the imaging plane 40 is identified on the basis of the signal D2, whereon the widow (or windows) which the obstacle 101 occupies is selected from the windows 41 to 43. By way of example, when the obstacle 101 located within only one (e.g. 41) of the preset windows 41, 42 and 43 is detected, it is then decided that the height of the obstacle 101 is low. On the other hand, when it is detected that the obstacle 101 extends across, e.g. the windows 41 and 42, it is then decided that the obstacle 101 is of an intermediate height. Furthermore, when it is detected that the obstacle 101 extends across all the windows 41, 42 and 43, it is then decided that the object 101 has a great height.

The size determining unit 3 then determines the size of the obstacle 101 on the basis of the width thereof indicated by the signal D1 supplied from the distance calculating circuit 12 and the height of the obstacle 101 determined through the procedure described above. Information of the size thus determined is supplied to an alarm device and/or a running control unit (not shown) together with the information of the distance to the obstacle.

Next, operation of the obstacle detecting system according to the instant embodiment of the invention will be described.

Figure 4:
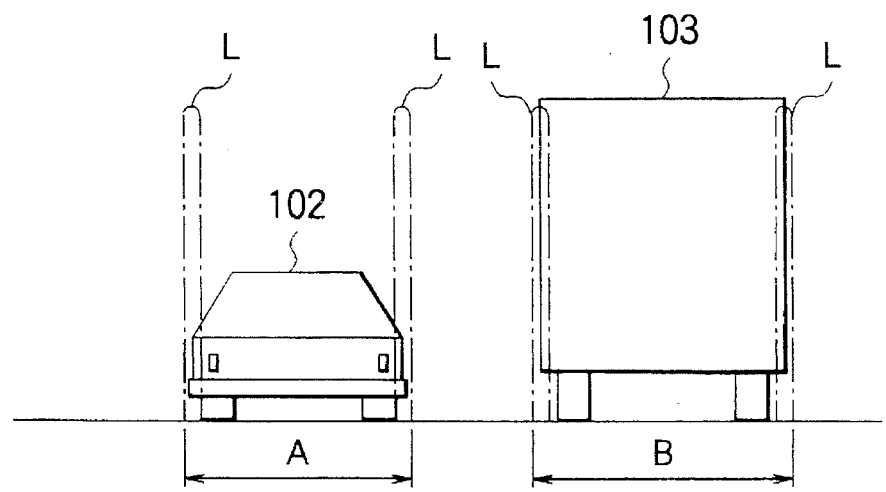
FIG. 4 is a schematic diagram for illustrating a state in which obstacles are swept or scanned with a flat laser beam in a laser radar type distance detecting unit constituting a part of the obstacle detecting system.

Referring to FIG. 4, it is assumed that a car 102 of a width A and a truck 103 of a width B are running at distance S and R, respectively, in front of the motor vehicle equipped with the obstacle detecting system.

On the assumption, when the laser beam sender circuit 10 sends out the flat laser beam L by deflecting it from the left to right and vice versa, the echo light beams resulting from reflection of the flat laser beam L by the car 102 and the truck 103, respectively, will be received by the laser beam receiving circuit 11, wherein the signals generated through photoelectric conversion are inputted to the distance calculating circuit 12, which then calculates the distances S and R to the car 102 and the truck 103, respectively, on the basis of temporal differences between the time point at which the flat laser beam L is sent out and the time points at which the echo light beams from the car 102 and the truck 103 are received, respectively, while taking into consideration the sweeping or deflection angle of the flat laser beam L. At the same time, the width A and B of the car 102 and the truck 103, respectively, are calculated on the basis of the calculated distances S and R and the angles of deflection of the flat laser beam L. The signals or information D1 indicative of the distances S and R and the widths A and B are then supplied to the size determining unit 3.

In the meanwhile, the spatial range which is swept by the flat laser beam L is picked up by the upper video camera 20 and the lower video camera 21 of the stereoscopic video camera unit 3, wherein the image signals outputted from the cameras 20 and 21 are supplied to the distance detecting circuit 23.

The window setting unit 4 sets up previously the windows 41, 42 and 43 each of the height h on the imaging plane at a left side together with the windows 44, 45 and 46 each of the height h at a right side, as can be seen in FIG. 3. The distance detecting circuit 23 in turn determines on the basis of the image signals outputted from the upper video camera 20 and the lower video camera 21 the distance S to the car 102 falling within the left-hand window and the distance R to the truck 103 caught by the right-hand windows.

Figure 5:
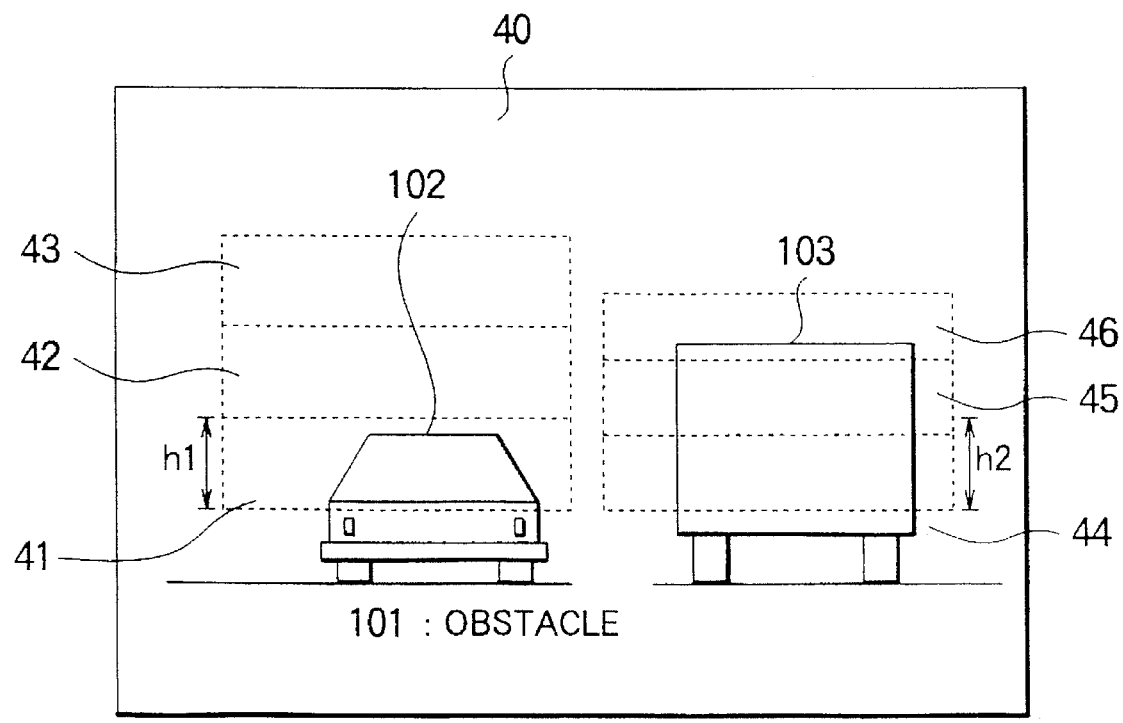
FIG. 5 is a schematic diagram showing images generated on the imaging screen of the stereoscopic video camera unit in the state corresponding to that illustrated in FIG. 4.

Subsequently, the height of each of the left windows 41, 42 and 43 is changed or updated to the value h1 in correspondence to the distance S with the height of each of the right windows 44, 45 and 46 being correspondingly updated to h2 in dependence on the distance R. Further, the distances to the car 102 and the truck 103, respectively, whose images are caught within the updated windows 41–46 are determined by the distance detecting circuit 23. Thereafter, the signal D2 indicating the distances S and R to the car 102 and the truck 103, respectively, and indicating the presence of the image of the car 102 within the preset or updated window 41 as well as the presence of the image of the truck 103 across the windows 44, 45 and 46 (refer to FIG. 5) is delivered from the distance detecting circuit 23 to the size determining unit 3.

Upon reception of the signal D1 from the distance calculating circuit 12 and the signal D2 from the distance detecting circuit 23, the size determining unit 3 arithmetically determines the sizes of the car 102 and the truck 103, respectively, on the basis of the signals D1 and D2.

More specifically, for the car 102, the window on the imaging plane 40 which covers the car 102 located at the distance coinciding with the distance S indicated by the signal D1 is selected on the basis of the signal D2, whereon it is determined that the car 102 is found only within the widow 41 and thus the height of the car 102 is low.

In this manner, it is determined by the size determining unit 3 that the car 102 located at the distance S has a small height and a large width A.

On the other hand, for the truck 103, the windows on the imaging plane 40 which cover the truck 103 located at the distance coinciding with the distance R indicated by the signal D1 is selected on the basis of the signal D2. When it is determined that the truck 103 extends across the windows 44, 45 and 46, it is then decided that the truck 103 has a great height and a width B.

In this way, the size determining unit 3 decides that the truck 103 located at the distance R has a great height and a large width B.

The size information as well as the distance information obtained through the procedure described above are supplied to an alarm device and/or a running control unit (not shown) of the motor vehicle.

As will now be appreciated from the foregoing description, with the arrangement of the obstacle detecting system according to the illustrated embodiment of the invention, it is possible to detect not only the distance to an obstacle such as typified by a car running in front of the motor vehicle equipped with the obstacle detecting system but also the size of the obstacle. In other words, because a greater amount of information concerning the obstacle or object existing in front of the motor vehicle equipped with the obstacle detecting system is made available according to the invention, the alarm device, the running control unit and others installed on the motor vehicle can operate more optimally and accurately with high reliability. Besides, even when a fault should occur in either one of the laser radar type distance detecting unit 1 or the stereoscopic video camera unit 3, there is available at least the information concerning the distance to the obstacle. Thus, even in the case in which either the laser radar type distance detecting unit 1 or the stereoscopic video camera unit 3 suffers a fault, the capability of the system for detecting an obstacle in front can be ensured at least to a same extent as that of the hitherto known obstacle detecting system which suffers no fault.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the three windows are generated in each vertical row or array by the window setting unit 4 in the case of the embodiment of the invention described above, the invention is not limited to any specific number of the windows. By providing four or more windows in each row, more detailed information concerning the height of the obstacle or the like can be obtained. Besides, although it has been described that the windows are generated in two rows in the horizontal direction, it is equally possible to generate three or more vertical rows of windows by increasing the angle of deflection of the flat laser beam L for detecting the presence of obstacles over a greater range swept by the beam. Furthermore, although the description has been made on the assumption that the distance calculating circuit 12, the distance detecting circuit 23, the window setting circuit 4 and the size determining unit 3 are implemented separately or discretely from one another, it goes without saying that they can be implemented by a microcomputer which is so programmed as to execute the operations described in the foregoing. Besides, the stereoscopic camera unit including a pair of cameras for detecting the actual distance to the obstacle in accordance with the principle of the trigonometric measurement may be replaced by another type optical distance measuring system such as those adopted in autofocusing type photographic cameras so far as the actual distance to the obstacle can be determined. Moreover, the obstacle detecting system according to the invention may be disposed at the rear side of the motor vehicle for assuring safety in driving the motor vehicle backwardly, as parenthetically indicated above with reference to FIG. 2. Of course, the stereoscopic camera unit may equally be implemented in the form of a split image type ranging apparatus adopted conventionally in photographic cameras. Besides, the distance calculating circuit 12 may be so designed as to calculate the distance to the object on the basis of phase difference between the laser beam sent out and the echo light beam as received.

Accordingly, all suitable modifications and equivalents may be resorted to, falling within the spirit and scope of the invention.

What is claimed is:

1. An obstacle detecting system for a motor vehicle, comprising:
   (a) a laser radar type distance detecting unit for detecting a distance to an object existing in a path of said motor vehicle as viewed in a first direction in which said motor vehicle is running,
   said distance detecting unit including:
      (i) laser beam sending means (10) for sending out a laser beam while deflecting said laser beam in a second direction laterally transverse to said first direction;
      (ii) echo light beam receiving means (11) for receiving an echo light beam resulting from reflection of said laser beam by said object; and
      (iii) distance calculating means (12) for arithmetically determining a distance to said object on the basis of a temporal period intervening between the send-out of said laser beam and the reception of said echo light beam;
   (b) an optical imaging unit including:
      (i) optical imaging means (20, 21) for picking up an image of an object located within a range swept by said laser beam;

(ii) window setting means (4) for presetting a plurality of windows at predetermined locations on an imaging plane of said optical imaging unit; and (iii) distance detecting means (23) for detecting a distance to an object caught by said optical imaging unit at least within one of said windows; and (c) object size determining means (3) for selecting a window corresponding to a distance value which is detected by said optical imaging unit and which coincides with a distance value calculated by said laser radar type distance detecting unit, to thereby determine a size of said object on the basis of the preset position of said selected window.

2. An obstacle detecting system for a motor vehicle according to claim 1, wherein said plurality of windows are preset in a vertical direction on said imaging plane of said optical imaging unit.

3. An obstacle detecting system for a motor vehicle according to claim 2, wherein said plurality of windows are arrayed in each of vertical rows which are arrayed in a horizontal direction on said imaging plane of said optical imaging unit, the number of said rows being determined in dependence on an angular range which is scanned with said laser beam.

4. An obstacle detecting system for a motor vehicle according to claim 1, wherein said optical imaging unit is constituted by a stereoscopic video camera unit including a pair of video cameras disposed in a vertical array, and wherein said distance detecting means (23) is designed to detect a distance to said object on the basis of output signals of said video cameras in accordance with a trigonometric measurement.

5. An obstacle detecting system for a motor vehicle according to claim 1, wherein said distance calculating means, said window setting means, said distance detecting means and said object size determining means are implemented by a microcomputer programmed correspondingly.

6. An obstacle detecting system for a motor vehicle according to claim 1, wherein said obstacle detecting system is disposed at a front side of said motor vehicle.

7. An obstacle detecting system for a motor vehicle according to claim 1, wherein said obstacle detecting system is disposed at a rear side of said motor vehicle.

\* \* \* \* \*